(12) United States Patent
Herminghaus et al.

(10) Patent No.: US 7,943,671 B2
(45) Date of Patent: May 17, 2011

(54) FORMATION OF AN EMULSION IN A FLUID MICROSYSTEM

(75) Inventors: Stephan Herminghaus, Goettlingen (DE); Ralf Seemann, Goettingen (DE); Craig Priest, Goettingen (DE)

(73) Assignee: Max-Planck-Gesellschaft zur Foerderung der Wissenschaften e.V., Munich (DE)

( * ) Notice: Subject to any disclaimer, the term of this patent is extended or adjusted under 35 U.S.C. 154(b) by 406 days.

(21) Appl. No.: 11/997,815

(22) PCT Filed: Aug. 7, 2006

(86) PCT No.: PCT/EP2006/007799
§ 371 (c)(1),
(2), (4) Date: Jul. 29, 2008

(87) PCT Pub. No.: WO2007/017230
PCT Pub. Date: Feb. 15, 2007

(65) Prior Publication Data
US 2008/0314761 A1   Dec. 25, 2008

(30) Foreign Application Priority Data

Aug. 8, 2005   (DE) .......................... 10 2005 037 401

(51) Int. Cl.
*B01F 3/08* (2006.01)
(52) U.S. Cl. .......................... 516/9; 204/228.1; 205/687
(58) Field of Classification Search ... 516/9; 204/228.1; 205/687
See application file for complete search history.

(56) References Cited

U.S. PATENT DOCUMENTS

| | | | | |
|---|---|---|---|---|
| 3,359,212 | A * | 12/1967 | Bailey ............................... | 516/55 |
| 4,601,834 | A * | 7/1986 | Bailes et al. ................... | 204/573 |
| 6,186,660 | B1 | 2/2001 | Kopf-Sill et al. | |
| 2004/0027915 | A1* | 2/2004 | Lowe et al. .................... | 366/341 |
| 2004/0040848 | A1* | 3/2004 | Schnelle et al. ............. | 204/450 |
| 2004/0068019 | A1* | 4/2004 | Higuchi et al. .................... | 516/9 |
| 2004/0228882 | A1 | 11/2004 | Qiu et al. | |

FOREIGN PATENT DOCUMENTS

| | | |
|---|---|---|
| DE | 10041823 A1 | 3/2002 |
| DE | 10206083 A1 | 8/2003 |
| EP | 0051463 A2 | 5/1982 |
| EP | 1359998 B1 | 8/2004 |
| WO | 0185297 A1 | 11/2001 |
| WO | 0216017 A2 | 2/2002 |
| WO | 0238262 A1 | 5/2002 |
| WO | 03068381 A1 | 8/2003 |
| WO | 2006027757 A2 | 3/2006 |
| WO | 2006082351 A1 | 8/2006 |

OTHER PUBLICATIONS

Anna et al., "Formation of dispersions using "flow focusing" in microchannels", Applied Physics Letters, vol. 82, No. 3 (2003), pp. 364-366.
Ehrfeld et al. in "Microreactors", Microreactors: New Technology for Modern Chemistry, pp. 44-46, 80-83, Weinhem, Wiley (2000).
Herminghaus, "Dynamical Instability of Thin Liquid Films Between Conducting Media", Physical Review Letters, vol. 83, No. 12 (1999), pp. 2359-2361.
Kralj et al., "Surfactant-enhanced liquid—liquid extraction in microfluidic channels with inline electric-field enhanced coalescence", Lab Chip (2005), pp. 531-535.
Song et al., "A Microfluidic System for Controlling Reaction Networks in Time", Agnew. Chem. Int. Ed., vol. 42, No. 7 (2003), pp. 767-772.
Song et al., "Experimental test of scaling of mixing by chaotic advection in droplets moving through microfluidic channels", Applied Physics Letters, vol. 83, No. 22 (2003), pp. 4664-4666.
Song et al., "Millisecond Kinetics on a Microfluidic Chip Using Nanoliters of Reagents", J. Am. Chem. Soc., vol. 125 (2003), pp. 14613-14619.
Tan et al., "Design of microfluidic channel geometries for the control of droplet volume, chemical concentration, and sorting", Lab Chip, vol. 4 (2004), pp. 292-298.
Thorsen et al., "Dynamic Pattern Formation in a Vesicle-Generating Microfluidic Device", Physical Review Letters, vol. 86, No. 18 (2001), pp. 4163-4166.
International Search Report for PCT/EP2006/007799, mailing date Jan. 31, 2007.

* cited by examiner

*Primary Examiner* — Ling-Siu Choi
*Assistant Examiner* — Chun-Cheng Wang
(74) *Attorney, Agent, or Firm* — Caesar, Rivise, Bernstein, Cohen & Pokotilow, Ltd.

(57) ABSTRACT

There is described a method for forming an emulsion (1) containing at least one dispersed phase (3) and a continuous phase (2) in a fluidic microsystem (100), said method comprising the steps: forming flows (4, 5) of different liquids which flow towards a dispersion region (10), and forming the emulsion (1) from the liquids in the dispersion region (10), wherein the flows (4, 5) run through a common channel (20) to the dispersion region (10) and the flows (4, 5) are arranged next to one another relative to a first reference direction, and wherein the emulsion (1) is produced as the liquids flow through a cross-sectional widening (11) provided in the dispersion region (10), at which the cross section of the channel (20) widens in a second reference direction different from the first reference direction. A fluidic microsystem for forming an emulsion (1) containing a continuous phase (2) and at least one dispersed phase (3) is also described. A fusion of droplets in electric fields is also described.

52 Claims, 6 Drawing Sheets

FORMATION OF AN EMULSION IN A FLUID MICROSYSTEM

BACKGROUND OF THE INVENTION

The invention relates to a method for forming an emulsion in a fluidic microsystem, wherein a continuous and at least one dispersed phase of the emulsion are produced from at least two different liquids in a dispersion region of the microsystem. The invention also relates to a fluidic microsystem which has at least one dispersion region for forming the emulsion. The invention also relates to a method for processing an emulsion in a fluidic microsystem, wherein droplets of a dispersed phase are fused under the effect of an electric field. The invention also relates to a fusion device for fusing dispersed droplets by means of electrocoalescence.

It is generally known to use fluidic microsystem technology in particular for chemical, biochemical, pharmaceutical or medical analyses. A fluidic microsystem contains channels or cavities having typical cross-sectional dimensions in the sub-mm range, through which liquids can flow. In the microsystem, the liquids or particles suspended therein can undergo physical or chemical treatments or measurements. One particular property of fluidic microsystems is that, due to the small cross-sectional dimensions, the flows are typically laminar and free of eddies, so that targeted control of the flows is possible. One significant advantage, particularly for chemical applications ("lab-on-a-chip"), is provided by the low substance consumption when using the microsystem technique.

A new branch of fluidic microsystem technology that has been developed is known as digital microfluidics, in which a liquid in the microsystem consists not of individual phases but rather of a plurality of phases (compartments) which are delimited from one another. The compartmentalized liquid forms a dispersion (emulsion) consisting of two or more liquids which do not mix within the microsystem. The use of compartmentalized liquids has the particular advantage that the substance consumption can be further reduced since e.g. one specific reaction partner is contained in only a few droplets of a dispersed phase of the emulsion. A further advantage consists in the complete prevention of axial dispersion in the compartmentalized liquid (see e.g. H. Song et al. in "Angew. Chem.", vol. 792, 2003, page 1145).

Various techniques for forming emulsions in fluidic microsystems are known, which differ by the mechanism for producing and distributing droplets of the dispersed phase in a continuous phase. In the so-called jet technique (see e.g. Y-C. Tan et al. in "LabChip", vol. 4, 2004, pages 292-298), an initially single-phase liquid, which after formation of the emulsion is to form the dispersed phase, flows at a high speed into a surrounding fluid which is to form the continuous phase after formation of the emulsion. During this, a liquid jet which is delimited from the surroundings is produced, which as a result of the so-called Rayleigh instability breaks down into individual droplets after a predefined jet length. Disadvantages of the jet technique are that it cannot readily be implemented in the microsystem during continuous operation ("on-line"), but rather requires the production of the emulsion outside the microsystem ("off-line"). There are also disadvantages since the rapidly flowing liquid jet results in a high substance consumption and low controllability of the emulsion formation. In the shear technique (see T. Thorsen et al. in "Phys. Review Letters", vol. 86, 2001, pages 4163-4166), the emulsion is formed at a T-junction of two channels. At the T-junction, the phase to be dispersed is pressed laterally into the continuous phase flowing in a straight line, wherein the emulsion is formed by a regular shear process at the T-junction. The shear technique has disadvantages since the monodispersity of the droplets produced and the possibility of producing emulsions containing a small volume of the continuous phase are limited.

In fluidic microsystems, it is not only the production of dispersions that is of interest, but also the targeted fusion of dispersion droplets in order for example to trigger chemical reactions of reaction partners in adjacent droplets. It is known to fuse dispersion droplets under the effect of an electric field (so-called electrocoalescence). By way of example, electrocoalescence using electrodes in a fluidic microsystem is described by J. and G. Kralj et al. in "Lab Chip", vol. 5, 2005, page 531, and in WO 2006/027757. The electrodes are arranged a certain distance apart in the longitudinal direction of a channel of the microsystem. When dispersed droplets are located in the gap between the electrodes, the droplets can be fused by applying a fusion voltage to the electrodes. The conventional techniques have a limited use due to the following disadvantages. Firstly, relatively high voltages, sometimes in the kV range, are required for fusion of the droplets. This is associated with problems regarding control of the electrodes and with a disadvantageous influencing of the dispersion by the high electric field. If, for example, sensitive macromolecules such as e.g. biological macromolecules in adjacent droplets are to be made to react, the macromolecules may be damaged in the high-voltage field. Another disadvantage is the limited selectivity of the droplet fusion, which typically involves an unspecified number of droplets in the gap between the electrodes.

The objective of the invention is to provide an improved method for forming an emulsion in a fluidic microsystem, by means of which the disadvantages of the conventional techniques are overcome and which is particularly suitable, with a high degree of monodispersity and/or an increased variability, for setting at least one of the parameters consisting of droplet size, droplet composition, volume ratio of the continuous and dispersed phases and spatial arrangement of the droplets of the dispersed phase. Furthermore, the method is intended to be suitable for use in a fluidic microsystem, in particular during continuous operation of the microsystem ("on-line"). The objective of the invention is also to provide an improved fluidic microsystem for forming an emulsion, by means of which the disadvantages of the conventional techniques are overcome and which is suitable for carrying out the abovementioned method. According to further aspects, the objective of the invention is to provide improved methods and devices for processing emulsions, in particular for fusing dispersed droplets using electric fields, by means of which the disadvantages of the conventional methods can be overcome.

These objectives are achieved by methods and devices of the invention.

SUMMARY OF THE INVENTION

With regard to the method, the invention is based on the general technical teaching of forming an emulsion (emulsion liquid) from different liquids which flow lined up side by side through a channel to a dispersion region, in which the width of the channel locally increases. The width of the channel increases in a direction different from the direction in which the liquids are lined up before the dispersion region (cross-sectional widening). Upstream of the dispersion region, a two-dimensional layer-like flow of the different liquids is formed in the channel. The channel has an elongate cross-sectional shape, of which the smaller dimension (hereinafter: height of the channel, channel height) is considerably smaller than the larger dimension (hereinafter: width of the channel, channel width). The channel height between bottom and top surfaces of the channel is so small that the different liquids simultaneously wet the bottom and top surfaces as they flow through the channel. The channel width between the side surfaces of the channel is selected such that the different liquids can pass through the channel simultaneously next to one another in predefined volume ratios.

The liquids, which in the channel approach the dispersion region and are to be transformed into the continuous and dispersed phases in the dispersion region, form parallel flows in the channel. Each of the flows comprises an individual, continuous liquid phase (single-phase flow). The flows are in a dynamically stable state, i.e. the interfaces between the flows are oriented in a stable manner in the channel at a distance from the dispersion region (dynamically stable interface).

At the cross-sectional widening in the dispersion region of the channel, the channel width increases in such a way that the dynamically stable state of the flows is destroyed. In general, this can be achieved with any cross-sectional widening which differs from the direction in which the flows are arranged next to one another (side by side) before the dispersion region. In practice, preference is given to a cross-sectional widening which extends perpendicular to the orientation of the flows, in particular perpendicular to the channel width or parallel to the channel height. In the dispersion region, the channel height increases to a value at which the flows do not wet the bottom and top surfaces of the channel in a stable manner. A transition to a dynamically unstable state takes place in the dispersion region.

The inventors have found that, during the transition from the dynamically stable state to the dynamically unstable state, surprisingly droplets with constant droplet diameters are formed which form the dispersed phase of the emulsion. The emulsion formed in the dispersion region is monodisperse. While the liquid which is transformed into the dispersed phase experiences a certain Laplace pressure in the channel upstream of the dispersion region due to the interaction with the bottom and top surfaces of the channel, the Laplace pressure is reduced in the dispersion region and therefore the layer thickness of the flow increases and a local suction effect is produced in the direction of the liquid flow. Since, as a result of this suction effect at the cross-sectional widening of the channel (dispersion region), the liquid is drawn out of the channel more rapidly than it can flow in, it is pinched off and therefore the droplet shape of the dispersed phase is formed. It has been found that this effect of reducing the Laplace pressure and forming droplets is carried out periodically with a high degree of regularity, so that the dispersed phase is formed with a high degree of monodispersity. The droplet size depends in particular on the extent of the cross-sectional widening in the dispersion region and can accordingly be adjusted by modifying the channel cross section (in particular the channel height) upstream of the dispersion region. Further possibilities for influencing the droplet size include adjusting the viscosity and/or the flow rates of the liquids fed to the dispersion region.

Another significant advantage of the method according to the invention consists in that the formation of the emulsion is brought about exclusively by the aforementioned transition from the dynamically stable to the dynamically unstable state, wherein this transition is independent of the orientation of the cross-sectional widening of the channel in the dispersion region relative to the external environment. If the microsystem is typically arranged and operated with a horizontally oriented bottom surface, the cross-sectional widening in the dispersion region may be obtained in particular by lowering the bottom surface, raising the top surface or a combination of lowering and raising. As an alternative, it is possible to arrange and operate the microsystem with non-horizontally oriented bottom and top surfaces. By way of example, the larger dimension of the channel may extend vertically and the smaller dimension of the channel may extend horizontally before the dispersion region. In this case, the cross-sectional widening in the dispersion region is likewise oriented horizontally.

Advantageously, there is also no particular requirement with regard to the shape of the cross-sectional widening. The channel may widen in the dispersion region for example locally by a ramp shape of the bottom and/or top surfaces. According to a preferred embodiment of the invention, however, a stepped cross-sectional widening is provided. The dispersion region is formed by a step at which the channel height is increased from a first value, at which the dynamically stable state is provided, to a second value, at which the dynamically unstable state is provided. One particular advantage of forming the emulsion at the stepped dispersion region consists in the improved monodispersity of the emulsion which, given a suitable choice of volumes of the continuous and dispersed phases, can be formed as a so-called crystalline emulsion.

The method according to the invention for forming emulsions can generally be carried out with all combinations of at least two liquids which have different surface tensions. In particular, direct emulsions (e.g. oil-in-water emulsions, O/W emulsions), indirect emulsions (e.g. water-in-oil emulsions, W/O emulsions) and more complex emulsions (e.g. O/W/O or W/O/W) can be formed.

If, according to another preferred embodiment of the invention, at least one of the liquids which is to form the at least one dispersed phase in the emulsion is fed into the channel upstream of the dispersion region through at least one injection channel, further advantages are obtained with regard to the controllability of the emulsion formation. The at least one injection channel opens as a side channel into one of the bottom or top surfaces of the channel. The liquid for forming the dispersed phase, which enters the channel through the injection channel, touches the bottom and top surfaces in the dynamically stable state, wherein preferably a contact angle relative to the bottom and top surfaces is formed which is greater than or equal to 90°. In the dynamically stable state, the liquid entering the channel from the injection channel and the liquid flowing in the channel for forming the continuous phase are automatically arranged in the form of the flows disposed next to one another. The liquid for the dispersing phase is preferably enclosed on both sides by partial flows for forming the continuous phase. The partial flow on one or both sides may comprise a thin film of the liquid for forming the continuous phase between the channel wall and the phase to be dispersed.

The feeding of a plurality of flows arranged next to one another to the dispersion region in the dynamically stable state according to the invention advantageously allows an extension such that a complex emulsion can be formed which contains for example a plurality of dispersed phases or combined dispersed phases. For this purpose, a plurality of single-phase flows or multi-phase flows of liquids for forming the dispersed phases are arranged next to one another in a manner separated by a partial flow of the liquid for forming the continuous phase. The different liquids for the dispersed phases are fed via a plurality of injection channels, which are arranged for example next to one another, into the channel where they run next to one another, in particular in parallel, to the dispersion region where the complex arrangements of the dispersed phases, which optionally contain different substances, are formed.

If, according to the invention, a plurality of different liquids for dispersed phases flow to the dispersion region, the emulsion formed therein may advantageously contain a plurality of dispersed phases, each of which comprises a series of dispersed droplets.

Significant advantages of the method according to the invention compared to the conventional jet or shear techniques lie in the high degree of constancy of the droplet size (monodispersity) of the dispersed phase and in the ability to set the volume ratio of the dispersed phase relative to the continuous phase. Preferably, the droplets of the dispersed phase have droplet diameters which are less than or equal to 1 mm. With particular preference, the diameters are less than 200 µm. As a result, particularly in the case of chemical or biochemical analyses, the substance consumption can advantageously be reduced and the analysis density can be increased. The droplet diameters depend in particular on the channel dimensions and on the ratio of the flow rates of the flows before the dispersion region.

One important advantage of the droplet diameter in the sub-mm range, which according to the invention can be achieved with a high degree of reproducibility, is the fact that the meta-stable state of the composition consisting of the continuous and dispersed phase achieved by forming the emulsion has a sufficiently long life for practical uses of the microsystem. The droplets of the dispersed phase can remain as delimited compartments until the desired use, e.g. for analytical purposes. In order to stabilize the meta-stable state if necessary, surfactants (e.g. sorbitan mono-oleate, CAS 1338-43-8) may be added to the liquids, e.g. to the continuous phase. However, it is not absolutely necessary to add surfactants. By way of example, emulsions of ferrofluids and water have proven to be extremely stable.

According to a further, preferred embodiment of the invention, a targeted setting of the flow rates of the single-phase flows flowing to the dispersion region may be provided. The inventors have found that the geometrical arrangement of the droplets of the dispersed phase in the emulsion can be reproducibly influenced as a function of the flow rate ratios of the flows. In order to form the emulsion, the ratio of the volume of the liquid for the dispersed phase flowing in per unit time to the volume of the liquid for the continuous phase is selected in the range from 0.1 to 0.9, and for an emulsion with regularly arranged droplets (crystalline emulsion) is selected in the range from 0.5 to 0.9. In the latter case, the droplets of the dispersed phase may form for example two rows of droplets which are offset relative to one another.

If, according to a further variant of the invention, the chemical composition of at least one of the liquids for the at least one dispersed phase is varied during the formation of the emulsion, the emulsion can be formed as a compartmentalized liquid comprising a succession of droplets, the chemical composition of which varies in a predefined manner. This advantageously makes it possible to carry out screening reactions with a high throughput rate. By way of example, the emulsion may comprise a succession of droplets having a varying pH value.

The invention has advantages not only for the emulsification process per se. Due to the high degree of monodispersity and the ability to control the geometry of the at least one dispersed phase, advantageous effects are also achieved for further manipulation steps, in particular for a further treatment of the emulsion. For instance, according to an advantageous embodiment of the invention, a splitting of the emulsion into at least two sub-emulsions may be provided. According to a first variant, the sub-emulsions may be formed by successions of droplets, wherein the volumes of the droplets are equal to the volume of the droplets of the emulsion before splitting. To this end, the emulsion is formed with at least two rows of droplets which are offset relative to one another, which for splitting purposes are separated into the sub-emulsions at a branching (in particular a Y-shaped channel junction). The separation may alternatively be for example a separation of 4 rows into 2 double rows or of 4 rows into one triple row and one single row or of 3 rows into one double row and one single row.

According to a second variant, the sub-emulsions may comprise droplets having volumes which are smaller than the volume of the droplets of the emulsion before splitting. The inventors have found that, due to the high degree of monodispersity and regularity of the emulsion formation when an individual succession of droplets meets a Y-shaped channel branching, advantageously each droplet can be split into two sub-droplets, in particular can be halved, with an unexpectedly high degree of regularity. The splitting of the emulsion may be provided in multiple stages at a plurality of branchings.

According to a further embodiment which is advantageous for the treatment and use of the emulsion formed according to the invention, a combining of sub-emulsions to form a common emulsion flow may be provided.

The combination of the aforementioned variants of splitting and combining emulsions and sub-emulsions may be combined as a function of the specific purpose of the fluidic microsystem, in order for example to produce specific successions of droplets or successions of droplet sizes. According to a particularly advantageous variant of the invention, the original emulsion formed may be rearranged for example. Initially the dispersed phase of the emulsion forms a straight succession of droplets (so-called "bamboo" structure). After rearrangement, the emulsion may form a plurality of parallel successions of droplets with a smaller or identical volume which are arranged offset relative to one another ("zig-zag" structure).

For use of the invention, it may important to achieve interactions between adjacent droplets at certain positions in the microsystem. According to a further embodiment of the invention, therefore, a fusing of two adjacent droplets of the at least one dispersed phase may be provided. The fusion of the adjacent droplets comprises an at least local break in the interface formed between the droplets by the continuous phase. In practice, it has proven to be particularly advantageous if the interface is broken by the effect of an electric field, irradiation with light or a local increase in temperature. The inventors have found that even a brief destabilization of the continuous phase by the electric field or the irradiation with light brings about fusion of the droplets.

The fusion of the droplets according to the invention may advantageously be provided independently of the type of droplet production. Preferably, with the method according to the invention for forming an emulsion, the droplets are produced at a cross-sectional widening of the channel in the microsystem. Alternatively, droplets produced using other, conventional emulsification methods can be fused according to the invention under the effect of electric fields.

The geometric arrangement of the droplets in the emulsion can be influenced by adjusting the volume ratios of the liquids for the continuous and dispersed phase. The formation of two straight successions of droplets comprising droplets arranged offset relative to one another is the result of a mutual influencing of the droplet formation in the dispersion region which was observed by the inventors for the first time. The droplet formation is automatically synchronized by means of self-organization. This phenomenon can also be achieved when forming a plurality of dispersed phases. As an alternative or in addition to the inherent (self-organizing) droplet formation, a time control of the droplet formation may be provided according to the invention. This variant is particularly advantageous when certain analyses, treatments or measurements on the emulsion are to be synchronized with the droplet formation. The time control may comprise for example a synchronization of the formation of droplets of different dispersed phases. With particular preference, the synchronization is achieved by a temporally controlled, local heating of the liquids before they enter the dispersion region.

With regard to the device, the abovementioned objective of the invention is achieved by the general technical teaching of further developing a fluidic microsystem for forming an emulsion, comprising a dispersion region and a channel which leads to the dispersion region, such that the channel upstream of the dispersion region forms a guide for a two-dimensional flow of liquids for forming the continuous and dispersed phases of the emulsion and in the dispersion region has a cross-sectional widening in a direction different from the two-dimensional orientation of the flow in the channel before the dispersion region, in particular perpendicular to the two-dimensional orientation.

The term "fluidic microsystem" here refers to any fluidic component with at lest two inputs for feeding in the liquids for the continuous and dispersed phases and at least one output for providing the emulsion, wherein the dispersion region is arranged preferably in the form of a step in a channel between the inputs and outputs. The fluidic microsystem contains channels or other cavities which in at least one direction have a typical cross-sectional dimension in the micrometer range (sub-mm range). The microsystem according to the invention is preferably formed as a fluidic chip. The dispersion region is arranged at a distance from the inputs for feeding in the liquids. The distance is preferably at least a diameter of the droplets of the dispersed phase, preferably at least 2 mm.

In order to provide guidance for a two-dimensional flow, the channel upstream of the dispersion region has an aspect ratio ($W_1/H_1$) which represents the quotient of the width ($W_1$) and height ($H_1$) of the channel and which is selected in the range from 100:1 to 2:1. In this range, advantageously most liquids of interest having applications in biochemistry or analytical chemistry can form two-dimensional flows.

Advantageous variants of the microsystem according to the invention are characterized by at least one of the components comprising a dosing device for setting a flow rate of the liquids for the continuous and dispersed phases, an adjusting device for varying the chemical composition of the liquid for the at least one dispersed phase, a single-stage or multi-stage branching for splitting the emulsion, a single-stage or multi-stage join for combining sub-emulsions, a fusion device for fusing adjacent compartments of dispersed phases, and a synchronization device for the time control of the droplet formation at the dispersion region.

With regard to the method, the invention according to a further aspect is based on the general technical teaching of providing a method for processing an emulsion containing droplets of the dispersed phase in the continuous phase in a fluidic microsystem, in particular the microsystem according to the invention, in which at least two droplets are fused when they are arranged on or move past at least two electrodes which are provided on a wall surface of the channel of the fluidic microsystem. Preferably, the fusion takes place by subjecting the electrodes to a voltage pulse at the point in time when a first droplet is in electrical (ohmic or capacitive) contact with a first electrode and an adjacent second droplet is in electrical (ohmic or capacitive) contact with a second electrode. This means that the dispersed phase of the droplets directly touches the electrode surface or is separated from the latter only by a lamella of the continuous phase which surrounds the droplets. Alternatively, an insulating layer, e.g. of a plastics material, may additionally be provided on the electrode material (the electrode surface), as a result of which advantageous electrochemical side effects are avoided.

The inventors have found that the droplet fusion does not necessarily require an electrical breakthrough. Instead, a dynamic destabilization of the lamella of the continuous phase arranged between the droplets is sufficient to bring about fusion. Advantageously, there is no need to use high voltages.

According to the invention, a voltage is applied to the droplets by the electrodes. On the droplets, an electrostatic potential is formed which is determined or defined by the electrode voltage. The potential is either provided by the direct electrical contact between the electrode and the droplet, or alternatively the capacitance in each case between the electrode and the droplet is comparable to or greater than the capacitance between the droplets.

A fusion device according to the invention for fusing dispersed droplets, which fusion device forms an independent subject matter of the invention, accordingly comprises in a channel of a fluidic microsystem at least two electrodes arranged on a wall surface of the channel and a control circuit for subjecting the electrodes to a voltage pulse, wherein the electrodes are arranged in such a way that, at the time of fusion, the adjacent droplets to be fused are in each case in contact with one of the electrodes.

If the voltage pulse has an amplitude of less than 15 V, particularly preferably equal to or less than 2 V, and if the duration of the voltage pulse is less than 100 ms, particularly preferably less than 10 ms, advantages are achieved due to a particularly gentle fusion of the dispersed droplets.

A further advantage of the fusion device according to the invention consists in the considerable variability with regard to processing differently formed emulsions. If the emulsion droplets in the channel of the microsystem form one succession of droplets (so-called "bamboo" structure), the electrodes are preferably arranged along the longitudinal extension of the channel. Alternatively, in order to fuse droplets which form a plurality of rows running next to one another in the channel ("zig-zag" structure), the electrodes may be oriented transversely to the longitudinal extension of the channel. In this case, the electrodes preferably protrude from the respective wall surface, e.g. the bottom, top or side surface of the channel, towards the centre of the channel.

BRIEF DESCRIPTION OF SEVERAL VIEWS OF THE DRAWINGS

Further details and advantages of the invention will become apparent from the following description of the appended drawings, in which.

DETAILED DESCRIPTION OF PREFERRED EMBODIMENTS

Preferred examples of embodiments of the invention will be described below with reference to the features of a channel with a dispersion region for forming an emulsion. The channel may be part of a fluidic chip or of a component for emulsion formation which is separate from a fluidic chip. Details regarding such fluidic chips or other microfluidic components, such as e.g. their coupling to liquid reservoirs, the production and control of liquid flows by pump devices, the conveying of samples, the flow-based influencing of the liquids and the carrying-out of measurements, are known per se from conventional fluidic microsystem technology and will therefore not be described in detail here. Furthermore, it is to be noted that the implementation of the invention is not limited to the sizes, shapes and materials of the channel with the dispersion region which are given by way of example. For instance, a channel with an elongate, rounded cross section may be provided instead of a channel with an elongate, rectangular cross section, or a ramp may be provided instead of a step in the dispersion region for widening the cross section.

Figure 1:
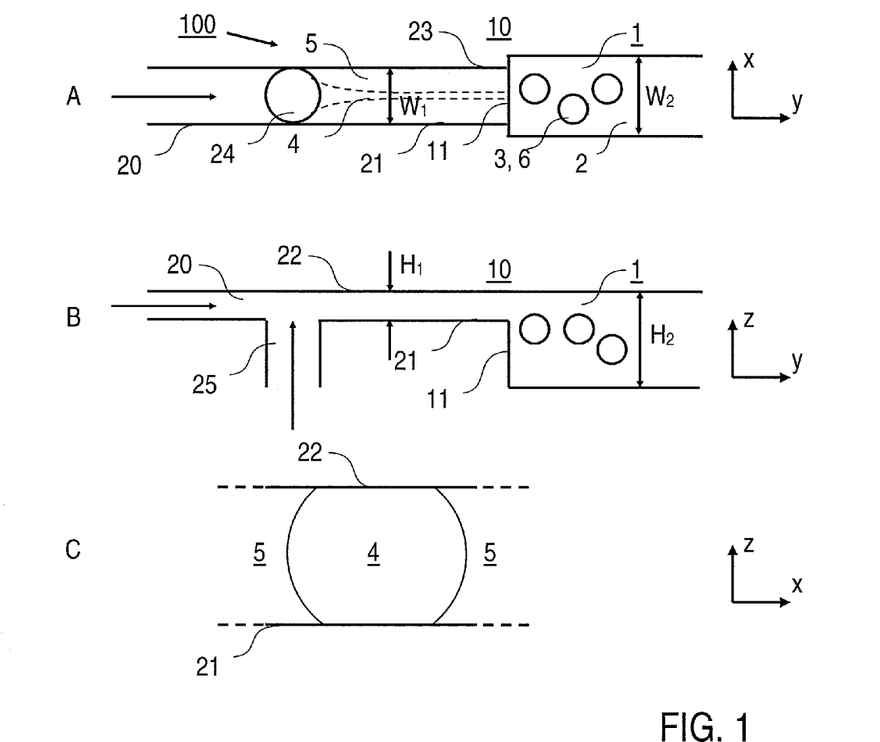
FIG. 1 shows schematic plan and side views of a first embodiment of a device according to the invention for forming an emulsion.

FIG. 1 shows, in schematic views on an enlarged scale, a plan view (FIG. 1A), a side view (FIG. 1B) and an enlarged sectional view (FIG. 1C) of a first embodiment of the device 100 according to the invention for forming an emulsion. The device 100 contains a dispersion region 10 which is arranged in a channel 20. The dispersion region 10 comprises a step 11, at which the channel height increases from a first value $H_1$ to a second value $H_2$. The step 11 forms the channel widening which according to the invention is used to form the emulsion, and at which a transition takes place from the dynamically stable to the dynamically unstable state of the liquids flowing in the channel 20. A widening from a first channel width $W_1$ to a second channel width $W_2$ is optionally also provided in the dispersion region 10.

Figure 2:
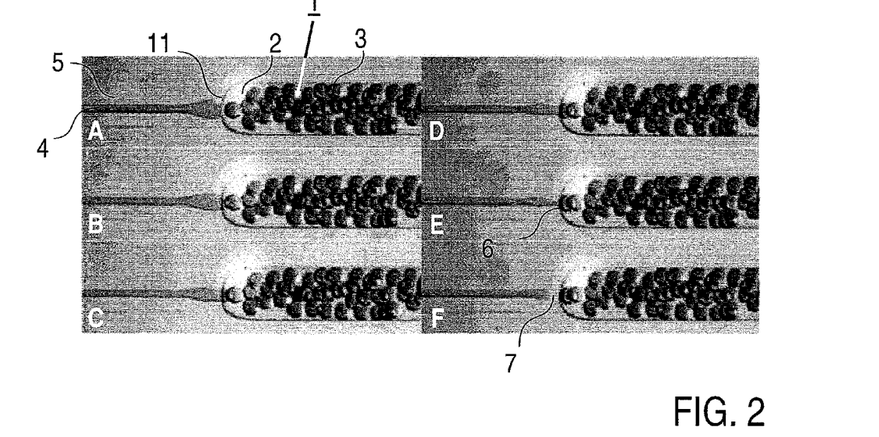
FIG. 2 shows a series of photographs of droplet production according to the invention.

The channel width $W_1$ is selected for example in the range from 200 μm to 1000 μm. In order to form complex emulsions (see e.g. FIG. 2), a larger channel width may be provided. The invention can also be implemented with smaller channel widths. The height $H_1$ is selected in such a way that a predefined aspect ratio $W_1/H_1$ is achieved, at which the liquids flowing in the channel 20 form a dynamically stable interface. Typically, the aspect ratio should be at least 10. Accordingly, the channel height $H_1$ is selected for example in the range from 5 μm to 100 μm.

The channel width $W_2$ downstream after the dispersion region 10 is selected for example in the range from 100 μm to 1000 μm. The channel height $H_2$ is for example 50 μm to 1000 μm, whereby downstream after the dispersion region the aspect ratio $W_2/H_2$ is considerably reduced and is for example 0.5 to 1.

The channel 20 comprises a plane bottom surface 21, a plane top surface 22 and side surfaces 23. Depending on the tool used to produce the channel 20, the side surfaces 23 may also be plane and perpendicular to the bottom and top surfaces 21, 22, or alternatively may be curved relative to at least one of the adjoining bottom and top surfaces 21, 22.

An inlet opening 24 is provided in the bottom surface 21 at a distance from the dispersion region 10, at which inlet opening an injection channel 25 opens in order to inject a liquid into the channel 20. In the illustrated example (FIG. 1A), the diameter of the injection channel 25 extends over the entire width $W_1$ of the channel 20. Alternatively, the diameter of the injection channel 25 may be smaller or larger than the channel width $W_1$.

The channel 20 along with the dispersion region 10 and the injection channel 25 are provided for example in a chip body of a fluidic microsystem. The chip body is produced in one or more parts and preferably has at least one part (e.g. a cover plate) made from a transparent material, e.g. plastic. As the material for the chip body, use is made for example of PMMA, which is advantageously optically transparent and is inert for most liquids of interest. As an alternative, the chip body or parts thereof may be made from other materials, such as e.g. glass or silicon.

According to an advantageous embodiment of the invention, the chip body has an electrically conductive layer on at least one surface facing towards the interior of the channel or branch (see below). Advantageously, the conductive layer may be placed at a predefined potential or a free potential ("floating") in order to avoid undesirable charging of the emulsion. The potential is selected in such a way that it equalizes an electrostatic potential of the droplets in the emulsion. The conductive layer may be provided for example on the bottom and/or top surfaces and may be for example at ground potential or at a free potential. This embodiment of the invention is particularly advantageous for emulsions which have a foam-like structure (small volume of the continuous phase), since these have proven to be extremely sensitive to electrostatic charges.

In order to form the emulsion 1 with a continuous phase 2 and a dispersed phase 3, flows 4, 5 of the different liquids for the continuous and dispersed phase are provided in the channel 20. The flows 4, 5 contain the corresponding liquids in each case as an individual liquid phase. In the illustrated example, two flows 4, 5 are produced. The flow 4 comprising the liquid for the dispersed phase 3 is enclosed on both sides by the flow 5 comprising the liquid for the continuous phase 2. FIG. 1C schematically shows, in an enlarged sectional view, the dynamically stable interface between the flows 4 and 5. The flow 4 of the liquid for the dispersed phase extends between the bottom and top surfaces 21, 22 of the channel 20. The bottom and top surfaces 21, 22 are directly touched by the flow 4, or else they are separated from the flow 4 by a (mesoscopic or molecularly thin) film of the liquid for the continuous phase.

The continuous phase comprises for example an organic solvent based on hydrocarbons (e.g. Isopar M, product name), while the dispersed phase comprises aqueous solutions or dispersions. The flow rate in the channel is e.g. around 10 to 100 mm/s.

As a result of the destabilization of the flows 4, 5 at the step 11, the dispersed phase 3 of the emulsion 1 which is distributed in the continuous phase 2 is formed. Unlike the conventional techniques, the formation of the droplets 6 of the dispersed phase 3 is based not on the effect of shear forces or a Rayleigh instability, but rather on the destruction of the dynamic stability before the step 11 and the formation of a new state of equilibrium under the effect of the surface tension and the Laplace pressure, which is reduced at the step 11. Advantageously, the cross-sectional widening of the channel 20 which is provided by the step 11 represents a considerably simplified channel geometry. Furthermore, an excellent monodispersity of better than 1.5% can be achieved in the emulsion. The droplet volumes can be set essentially by the channel height $H_1$ and the channel width $W_1$, while the flow rate has barely any influence on the droplet size.

Another advantage of the emulsion formation at the step 11 is that no additional droplets (so-called satellite droplets) are formed. The pinching-off at the step 11 takes place at a high speed (pinching-off within a few milliseconds), so that a reliable pinching-off of each droplet is possible.

FIGS. 2A to 2F are photographs of the process of pinching-off a droplet 6 of the dispersed phase 3, said photographs in each case being recorded at a time interval of 2 ms. FIG. 2A shows, upstream of the step 11, the flows 4 and 5 for the dispersed and continuous phase. A channel widening according to FIG. 1 is provided at the step 11. Downstream after the step 11, the channel is filled with the emulsion 1 comprising the continuous phase 2 and the dispersed phase 3. FIG. 2A shows the situation when the pinching-off of a droplet at the step 11 has just finished. Shortly thereafter, further liquid of the flow 4 passes over the step 11 (FIGS. 2B, 2C). After passing the step 11 and after the reduction in the Laplace pressure acting on the flows 4, 5, the next droplet grows (FIGS. 2D, E), which draws liquid out of the flow 4 upstream of the step 11 as a result of the reduced Laplace pressure. As a result, during the pinching-off process (FIG. 2F), a gap 7 can be seen between the droplet that has just been pinched off and the flow 4. After a widening of the end of the flow 4 (see FIGS. 2A, B), the gap 7 is then breached by the subsequent flowing liquid, so that the next droplet can be formed.

The volume of the droplets 6 of the dispersed phase 3 depends on the ratio of the flow rates of the flows 4, 5. For the quotient of the flow rates of the flow 4 (for the dispersed phase) and the flow 5 (for the continuous phase) in the range from 0.1 to 0.8, an essentially linear dependency of the droplet volume is obtained in the range from 0.1 nl to 0.4 nl (total flow rate: 147 µl/h, channel height $H_1$: 10 µm). The frequency of droplet production can also be set as a function of the flow rate. For flow rates of the flow 4 (for the dispersed phase) of up to 0.15 µl/s, linear dependencies of the frequency of droplet production were found which for larger droplet volumes (e.g. 2.6 nl) were up to 50 Hz and for smaller droplet volumes (e.g. 0.3 nl) were up to 120 Hz. The upper limit of the frequency of droplet formation depends on the interface tension, the viscosities of the dispersed and continuous phase, and the droplet volume. The high droplet frequencies achieved according to the invention while simultaneously providing good control of the droplet volume and monodispersity are an important advantage of the invention for industrial applications in the case of "on-line" emulsification in the fluidic microsystem or a corresponding component.

The flow rates are controlled by a dosing unit (not shown), which comprises e.g. a dosing pump or an injection pump.

Figure 3:
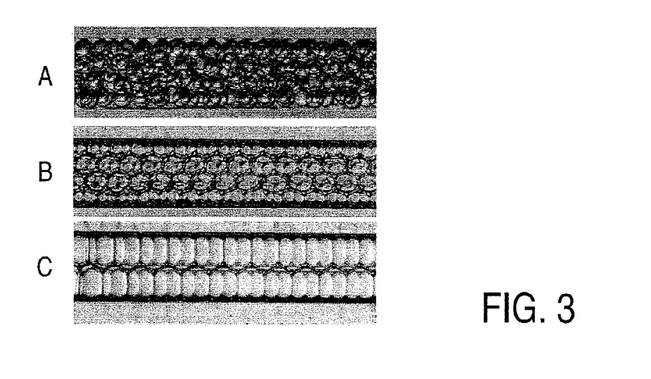
FIG. 3 shows photographs of different variants of the arrangement of the dispersed phase.

FIGS. 3A to 3C illustrate how the geometric arrangement of the dispersed phase in the emulsion can be influenced by adjusting the ratios of the flow rates. In the case of a volume of the liquid for the dispersed phase of 55% (FIG. 3A), the droplets of the dispersed phase form an unordered packing. For a larger volume of e.g. 79% (FIG. 3B) or 85% (FIG. 3C), an ordered, foam-like arrangement is obtained, in which the volume of the emulsion is substantially formed by the volume of the droplets of the dispersed phase, which are separated from one another by thin layers of the continuous phase. Using the technique according to the invention, the formation and manipulation of foam-like, regular structures in liquid/liquid systems is possible for the first time, which were previously achieved only in liquid/gas systems with larger dimensions. An arrangement of the droplets according to FIG. 3C can also be achieved by simultaneously producing two dispersed phases (see below).

Figure 4:
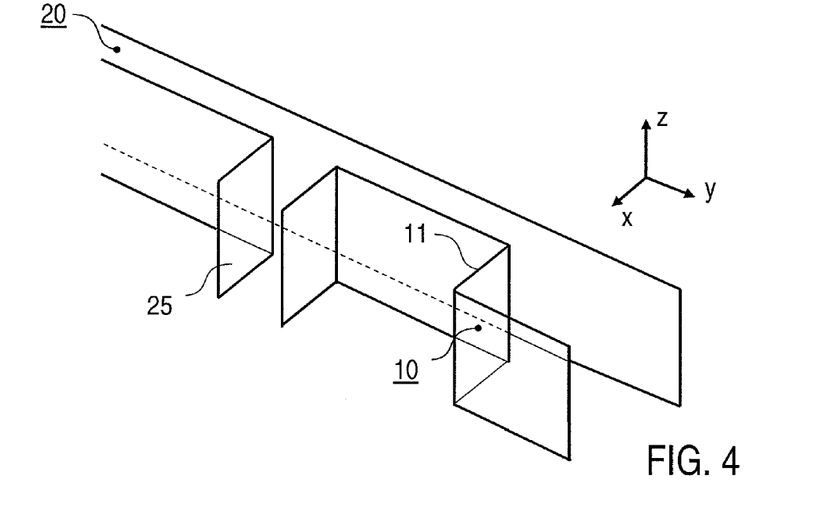
FIG. 4 shows a schematic perspective view of a further embodiment of a device according to the invention for forming an emulsion.

FIG. 4 shows part of a modified embodiment of the device according to the invention in a schematic perspective view showing the dispersion region 10, the channel 20 and the injection channel 25. The structure and function of the embodiment of the invention shown in FIG. 4 corresponds substantially to the details already discussed with reference to FIG. 1, but the channel 20 and the step 11 of the dispersion region 10 are oriented differently in space compared to FIG. 1. The elongate cross-sectional shape of the channel 20 extends in the z-direction, i.e. in the vertical direction, while the step 11 forms a cross-sectional widening in the horizontal direction. It is a significant advantage of the invention that the formation of the emulsion is essentially independent of the effect of gravity and thus independent of the orientation of the device 100 in space. In the system according to FIG. 4, too, the droplets of the dispersed phase (not shown) can be pinched off after the destabilization of the flows at the step 11.

Figure 5:
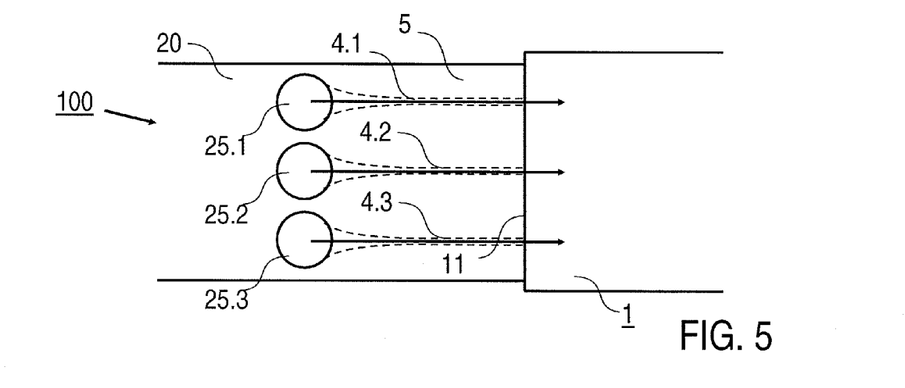
FIG. 5 shows a schematic plan view of a further embodiment of a device according to the invention for forming an emulsion.

If an emulsion containing a plurality of different dispersed phases is to be formed using the device 100 according to the invention, it is advantageously possible to use a structure which is shown in a schematic plan view in FIG. 5. The device 100 again contains the dispersion region 10 with the step 11 in the channel 20. Three injection channels 25.1, 25.2 and 25.3 open into the bottom surface 21 of the channel 20, through which identical or different liquids can be injected into the channel 20 in order to form a plurality of dispersed phases. The flows 4.1, 4.2 and 4.3 are embedded in the flow 5 of the liquid for the continuous phase as described above. By simultaneously pinching off the droplets at the step 11, three dispersed phases are formed which, when a high volume of the flows 4.1, 4.2 and 4.3 compared to the flow 5 is set, are separated from one another only by thin lamellae of the continuous phase. The structure shown in FIG. 5, which can be extended in an analogous manner to four or more injection channels, thus allows the targeted arrangement of different substances in adjacent droplets (compartments) of the dispersed phase in the emulsion 1. The emulsion droplets produced by the arrangement shown in FIG. 5 can in each case have different volumes depending on the flow volumes of the flows 4.1, 4.2 and 4.2 that are set.

When forming an emulsion containing a plurality of dispersed phases as shown in FIG. 5, the droplets of the dispersed phases may form a regular geometric arrangement as a result of self-organization, e.g. analogously to FIG. 3C with three straight successions of droplets which are arranged offset relative to one another. This self-alignment is achieved in particular in the case of high volume ratios, that is to say when there is a large volume of the dispersed phase in the emulsion. The mutual alignment of the droplets, particularly also in the case of low volume ratios, can be improved by a time control of the pinching-off of the droplets, which will be described below with reference to FIGS. 6 to 8.

Figure 6:
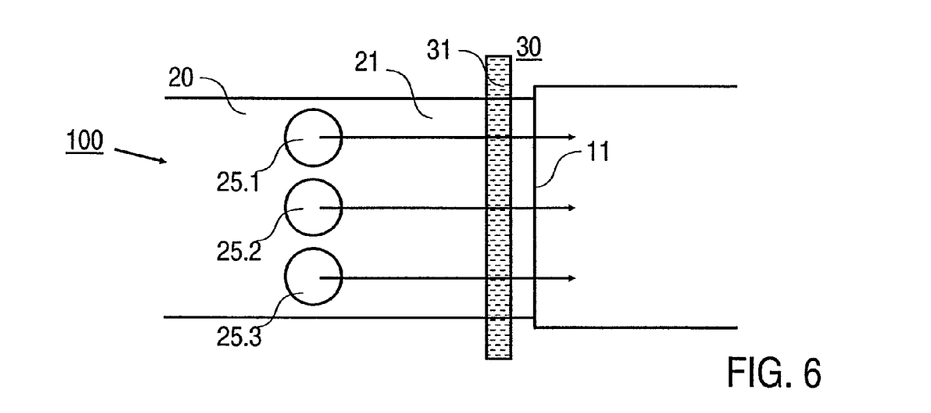
FIGS. 6 to 8 show different embodiments of synchronization devices provided according to the invention for the time control of droplet production.

FIG. 6 shows an embodiment of the device 100 according to the invention which is analogous to FIG. 5, wherein a synchronization device 30 is additionally provided for the time control of the droplet formation. The schematically shown synchronization device 30 comprises a heating strip 31 which is arranged running along the bottom surface 21 perpendicular to the flow direction in the channel 20. The heating strip 31 is designed e.g. for resistance heating and consists of a thin strip of metal or another electrically conductive material. The width of the heating strip 31 is e.g. 2 to 100 µm.

The heating strip 31 is connected to a control circuit (not shown), by means of which the heating strip 31 is subjected to electric current pulses. As a result of the current pulses, a local heating of the liquids in the channel 20 is achieved. As a result of the local heating, a so-called Marangoni transport is produced in the liquids (convection based on the Marangoni effect), which brings about synchronization of the pinching-off of droplets at the step 11. As a result of the Marangoni effect, the interface tension between the different liquids (e.g. between the oil and water phases) is spatially and temporally modulated. The constant flow from the injection channels 25.1, 25.2 and 25.3 to the step 11 is thus superposed with an oscillatory flow which influences the pinching-off of droplets. The inventors have found that the frequency of the pinching-off of droplets corresponds to the frequency of the current pulses on the heating strip 31. Since the Marangoni effect is very pronounced in the fluidic microsystem, advantageously low heating currents which provide heating by a few degrees are sufficient to achieve the described synchronization.

Figure 7:
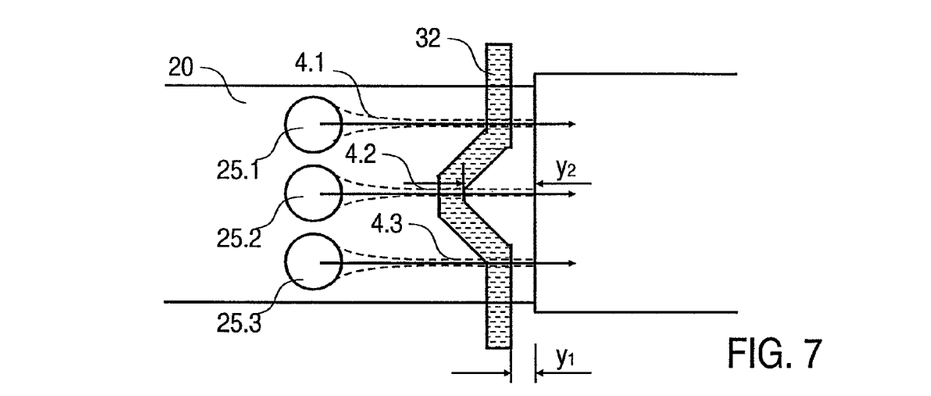

If the droplets are to be produced simultaneously at the step 11, the heating strip 31 for all the flow regions is arranged at the same distance from the step 11. If the droplet production is to follow a specific time schedule, a synchronization device with a modified heating strip 32 may be provided as shown in FIG. 7. The heating strip 32 has a curved profile, so that the local heating for the outer flows 4.1 and 4.3 takes place at a smaller distance $y_1$ from the step 11 than for the central flow 4.2, for which the local heating takes place at a greater distance $y_2$ from the step 11. The distances $y_1$ and $y_2$ are e.g. 100 µm and 200 µm. As a result, the droplets from the flows 4.1 and 4.3 are produced in a manner that is temporally offset relative to the droplets of the flow 4.2. The droplets of the dispersed phase are offset relative to one another and form a so-called honeycomb structure.

Figure 8:
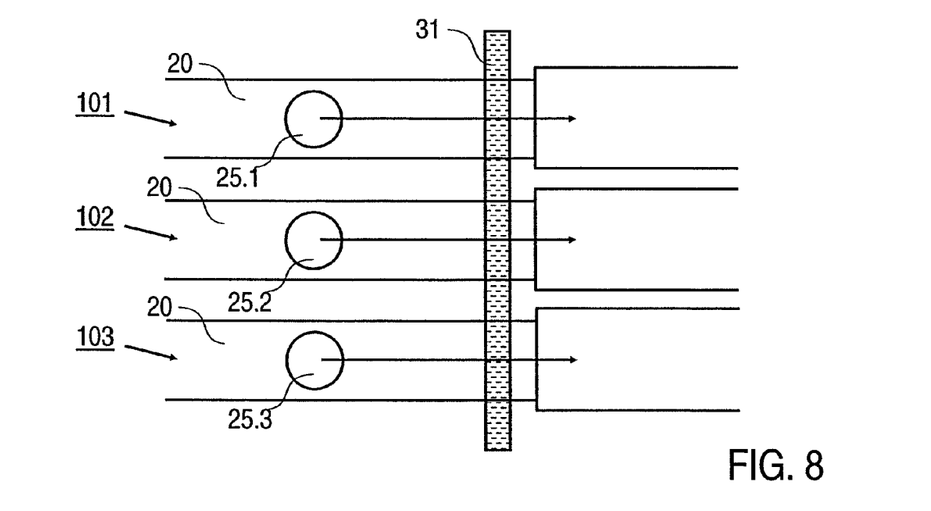

The time control of the emulsion formation by the synchronization device 30 may be advantageous not only in the case of the embodiment shown in FIG. 5 but also in the event of parallel operation of a plurality of devices 100, 101, 102 for forming emulsions, as illustrated schematically in FIG. 8. The droplets of the dispersed phase are formed in the channels 20 according to a predetermined time schedule, which is defined by the pulsed application of heating currents to the heating strip 31 running across all three channels. The heating strips may be formed separately for each channel and may be actuated separately. A triggering of the pinching-off processes relative to one another which is variable and can be controlled in a targeted manner is thus possible. The channels 20 may subsequently be combined to form a common channel (see below) in which the dispersed phases have a predefined geometric orientation relative to one another.

The synchronization of the droplet production is particularly advantageous in applications of the invention where the relative position of the droplets (compartments) of the dispersed phase is to be controlled. If, for example, an emulsion containing two dispersed phases as shown in FIG. 3C is produced using two parallel injection channels (analogously to FIG. 5), the composition, e.g. the pH value, of one of the two dispersed phases can be continuously varied. The pH value may increase in steps from droplet to droplet over e.g. 100 droplets from pH=3 to pH=11. In order to be able to monitor in a reproducible manner the result of the reaction of the contents of droplets having such a precisely defined composition, it must also be possible to set the position of the individual droplets in a reproducible manner as the flow continues.

The chemical composition of the liquid for the dispersed phase is controlled by an adjusting device (not shown), which comprises e.g. a combination of dosing pumps or injection pumps.

According to the invention, a rearrangement of the successions of droplets may be provided in order to bring droplets having predefined compositions into the direct vicinity of one another for a chemical reaction. The rearrangement may be achieved by means of channel structures which will be described below by way of example with reference to FIGS. 9 to 13.

Figures 9, 10:
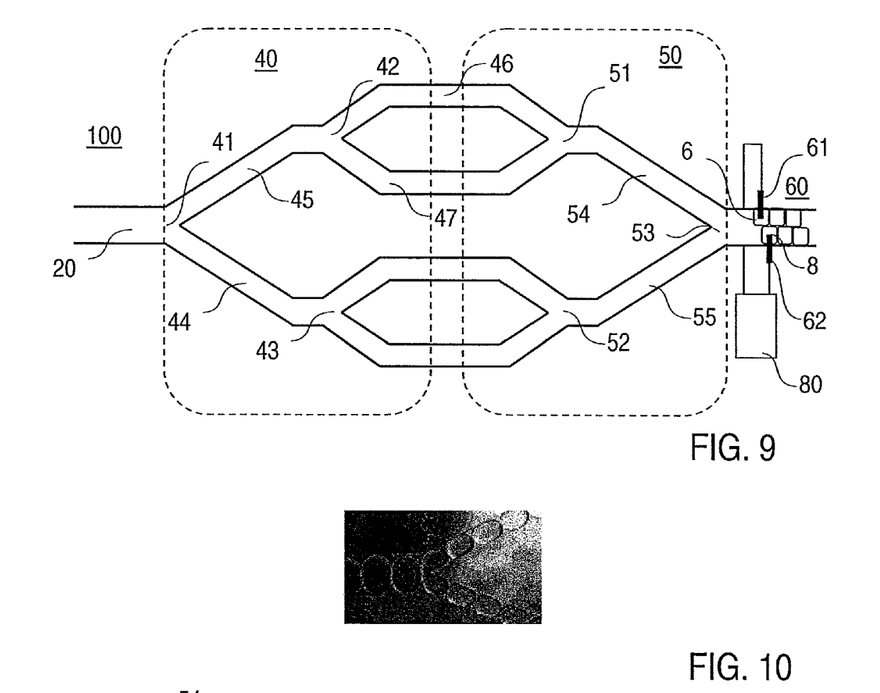
FIGS. 9 to 11 show examples of embodiments of channel geometries for splitting or combining emulsions.

According to FIG. 9, the channel 20 of the device 100 according to the invention is connected to a splitter device 40 which comprises a plurality of channel branchings 41, 42 and 43. A joining device 50 is also provided, at which the branches of the channel 20 are combined again at joins 51, 52 and 53. The rearrangement or manipulation of an emulsion in the channel 20 takes place as a function of the droplet arrangement before entering the splitter device 40 and the length of the branches between the channel branchings 41, 42 and 43 and the joins 51, 52 and 53.

If the emulsion comprises two straight successions of droplets arranged offset relative to one another (analogously to FIG. 3C) before entering the splitter device 40, the two successions of droplets are separated from one another at the first branching 41. One single succession of droplets arranged one behind the other ("bamboo" structure) is then located in each of the branches 44, 45, said droplets being split at the branchings 42 and 43 into partial droplets with half the volume. This halving is illustrated in the photograph shown in FIG. 10. Advantageously, according to a modified variant, the volume of the droplet can be split unequally into two droplets depending on the flow rates in the individual channels of the Y-junction. In the joining device 50, the sub-emulsions in the individual branches are combined again, with two straight successions of droplets arranged offset relative to one another being formed as a result. With regard to which droplets are adjacent to one another, this depends on the length of the branches 44, 45, 46, 47, 54 and 55.

If an emulsion with the "bamboo" structure is already provided before entering the splitter device 40, the droplets thereof are halved at the first branching 41, so that after passing through the joining device 50 an emulsion having the "zig-zag" structure is formed, in which the volumes of the partial droplets are quartered compared to the droplets before the splitter device.

An interaction between adjacent droplets 6, 8 of an emulsion formed according to the invention can be achieved by breaking through the separating layer of the continuous phase arranged between the droplets. To this end, use may be made of a fusion device 60, which is illustrated by way of example in FIGS. 9 and 14. The fusion device 60 comprises two electrodes 61, 62 which are arranged for example on the bottom surface of the channel 20 and are connected to a control circuit 80 (not shown in FIG. 14). As two droplets 6, 8 which are to be made to interact pass across the electrodes 61, 62, said electrodes are subjected to a brief voltage pulse. Under the effect of the electrical voltage, the separating layer between the droplets 6, 8 is broken through, which leads to the fusing of said droplets. The interaction comprises for example a chemical reaction between the substances contained in the droplets or a reaction of biological materials which are contained in the droplets in suspended form. The voltage pulse applied in order to fuse two adjacent droplets has e.g. an amplitude of 2 V and a duration of 10 ms or 100 ms.

According to FIG. 14A, the electrodes 61, 62 are formed by electrically conductive layers which are arranged one behind the other in the longitudinal direction of the channel (see arrow), with a slight gap being provided between the electrodes. The gap between the electrodes is smaller than the axial length of the droplets 6, 8 in the longitudinal direction of the channel. The upper part of FIG. 14A shows how the droplets 6, 8 to be fused move past the electrodes 61, 62. When the lamella between the droplets 6, 8 is arranged over the gap, i.e. when in each case one of the droplets 6, 8 is in contact with one of the electrodes 61, 62, a voltage pulse is applied to the electrodes 61, 62. As a result, the fused droplet 9 forms as shown in the lower part of FIG. 14A.

FIG. 14B shows a corresponding electrode arrangement for fusing droplets which form adjacent rows of droplets ("zig-zag" structure) in the channel 20. When the droplets 6, 8 to be fused move past the electrodes 61, 62 on a top surface of the channel 20, a voltage pulse is applied to said electrodes so that the fused droplet 9 is formed. The electrodes 61, 62 are formed by electrically conductive layers which, in the longitudinal extension of the channel 20, have a width that is smaller than the droplet width. As an alternative, wire-type electrodes 61, 62 may be arranged in the channel 20, for example on one or more of the walls thereof.

Figure 14:
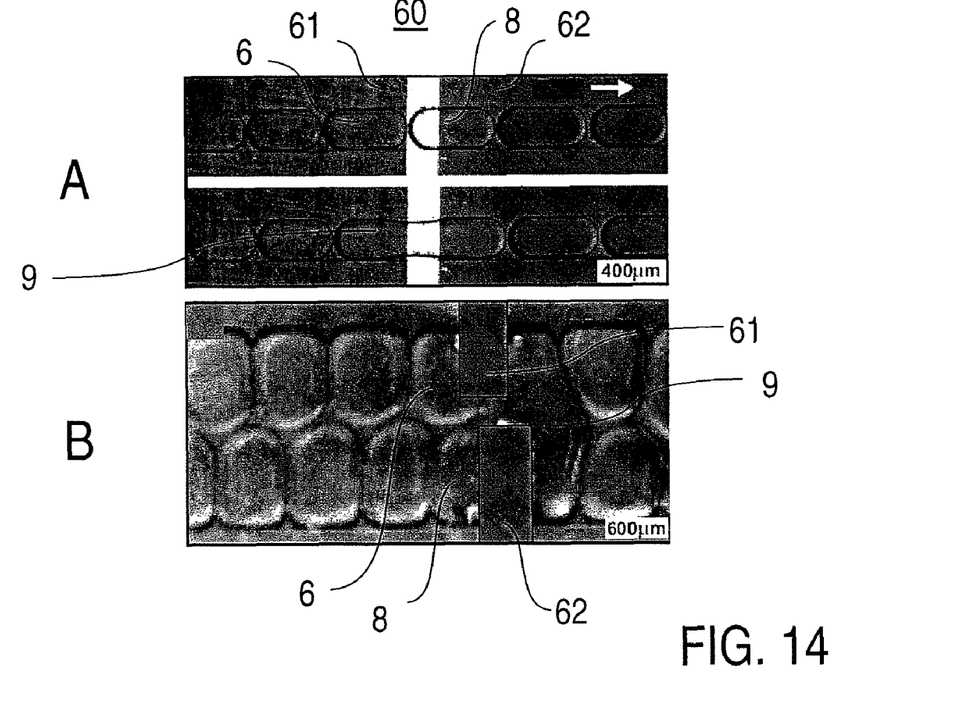
FIG. 14 shows further embodiments of electrode arrangements of a fusion device according to the invention.

The right time to apply the voltage pulse to the electrodes can be determined by a sensor device (not shown), by means of which the respective position of the droplets 6, 8 in the channel 20 of the microsystem is detected. The sensor device may be based for example on an electrical or optical detection of the droplet position.

Figure 15:
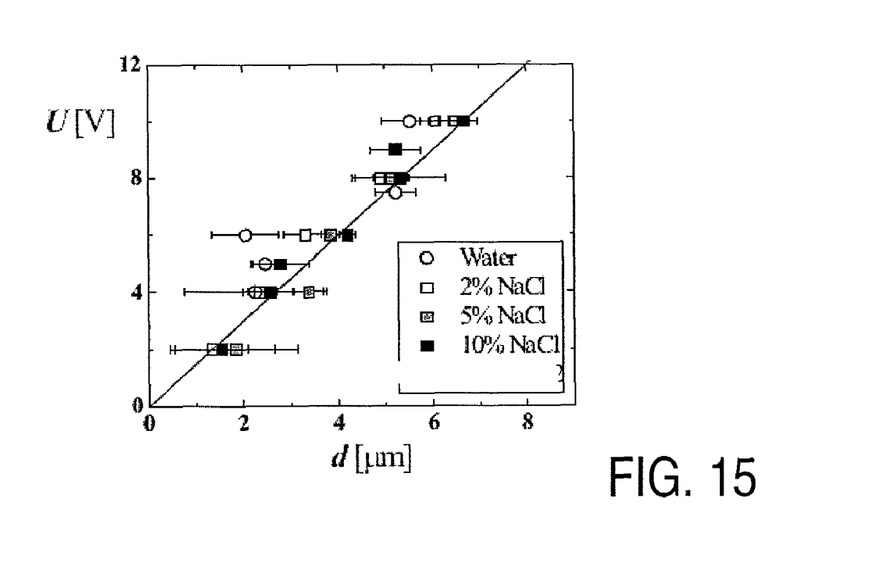
FIG. 15 shows a graph of the choice of voltage amplitudes for fusing dispersed droplets at different lamella thicknesses.

FIG. 15 shows experimental results obtained with the fusion device according to the invention. The amplitude (U) of the voltage pulse for fusing the droplets is shown as a function of the distance between the droplets, i.e. the thickness of the lamella of the continuous phase provided between the droplets, for different dispersed phases. As the distance between the dispersed droplets increases, an increasing voltage amplitude is required for the electrocoalescence of the droplets, although advantageously voltages below 12 V are sufficient for electrocoalescence in the range of interest below a distance of 10 μm. If, according to the abovementioned embodiment of the invention, an electrically conductive layer is provided on the bottom and/or top surfaces, this layer is interrupted in the vicinity of the electrodes of the fusion device.

The fusion device 60 may be modified such that, instead of the two electrodes 61, 62 that are shown, one or more electrode arrays which each comprise a plurality of electrodes are provided. The electrodes may be arranged on at least one of the bottom, top and side surfaces of the channel 20. The actuation of the electrodes may be selected as a function of the droplet size produced in the specific application.

Figure 11:
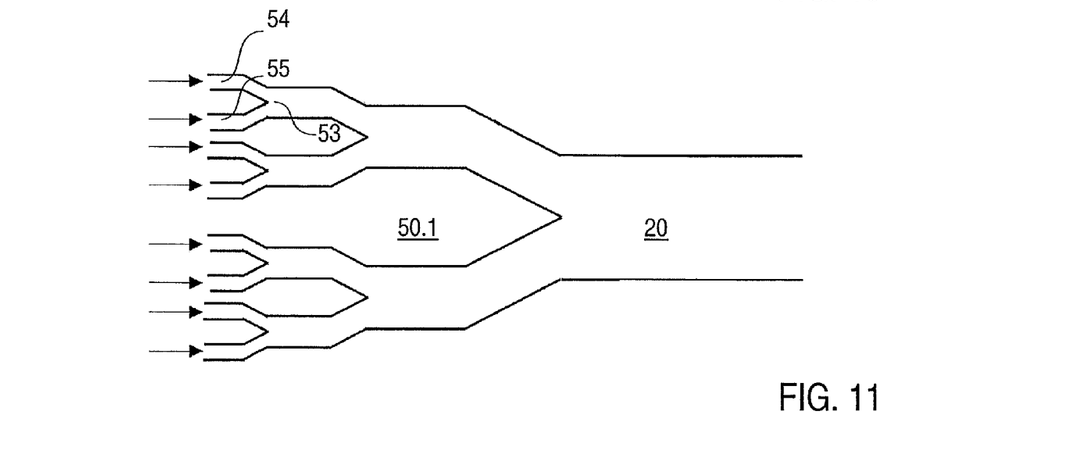

A modified variant of a joining device 50.1 for combining a plurality of emulsions in multiple stages is shown in a schematic plan view in FIG. 11. The individual emulsions flow together e.g. via the branches 54, 55 and joining points 53 (see arrow direction), until an essentially two-dimensional arrangement of the dispersed phases is achieved in the channel 20. By way of example, 16 rows of droplets arranged offset relative to one another may run in parallel in the channel 20. This combining of the emulsions may be advantageous for example for biochemical uses of the invention. The emulsion in the channel 20 forms a droplet array which can be read like a substance library e.g. by optical means.

In a further modified variant of a joining device for combining a plurality of emulsions in multiple stages, a three-dimensional arrangement of the droplets may be formed. In this case, the branches containing individual rows of droplets or containing a two-dimensional arrangement of droplets, e.g. as shown in FIG. 11, fuse at the joining points relative to one another with a vertical orientation.

Figure 12:
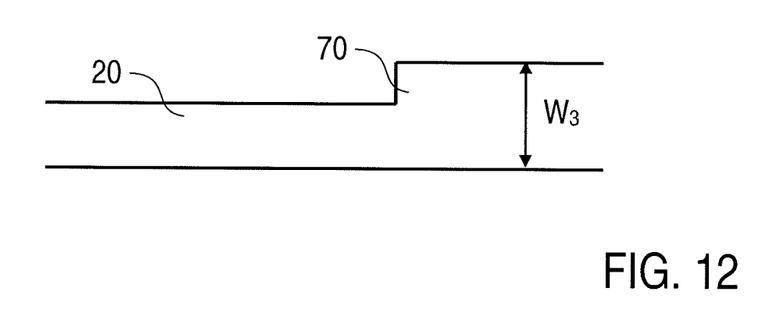
FIGS. 12 and 13 show different embodiments of a positioning device used according to the invention for arranging the droplets of the dispersed phase.
Figure 13:
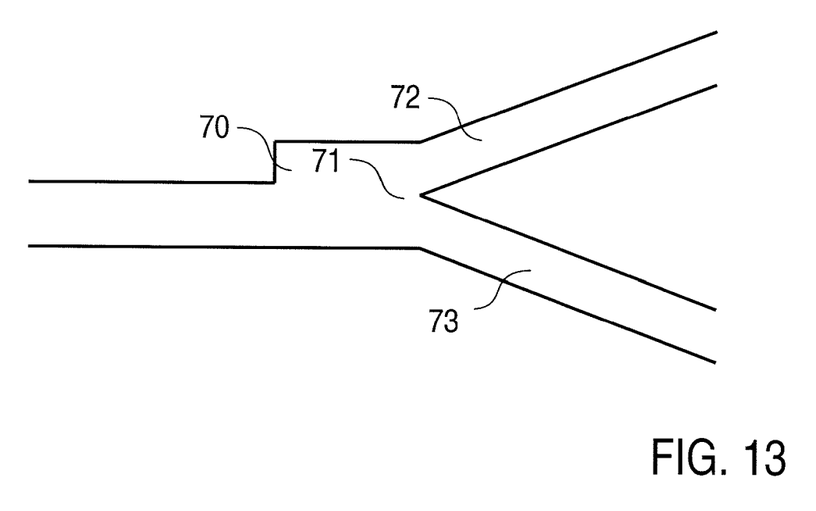

The transformation of an emulsion comprising a straight succession of droplets arranged one behind the other ("bamboo" structure) into an emulsion comprising two rows of droplets arranged offset relative to one another ("zig-zag" structure) is shown schematically in FIGS. 12 and 13. A positioning device 70 which is used according to the invention is formed by a second channel widening, at which the channel width increases to a third value $W_3$. The channel width $W_3$ corresponds e.g. to twice the channel width $W_2$ before the second channel widening. The droplets moving through the channel 20 from the left in FIG. 12, after passing the positioning device 70, form a pattern of droplets arranged offset relative to one another in the flow direction ("zig-zag" structure). As shown in FIG. 13, the positioning device 70 may additionally have a branching 71, at which the partial successions of rearranged droplets are separated into different branches 72, 73.

The features of the invention which are disclosed in the above description, the drawings and the claims may be important both individually and in combination with one another for implementing the invention in its various embodiments.

The invention claimed is:

1. A method for forming an emulsion including at least one dispersed phase and a continuous phase in a fluidic microsystem, said method comprising the following steps:
    forming flows of different liquids which flow towards a dispersion region, and
    forming the emulsion from the liquids in the dispersion region,
    wherein
    the flows run through a common channel to the dispersion region, wherein the flows are arranged next to one another relative to a first reference direction, and
    the emulsion is produced as the liquids flow through a cross-sectional widening provided in the dispersion region, at which the cross section of the channel widens in a second reference direction parallel to the channel height.

2. The method according to claim 1, in which the emulsion is produced as the liquids flow over a step provided in the dispersion region.

3. The method according to claim 2, in which at least one of the flows is fed into the channel through at least one injection channel.

4. The method according to claim 3, in which a plurality of flows is fed into the channel at a plurality of injection channels.

5. The method according to claim 1, in which the at least one dispersed phase comprises droplets, the diameter of which is less than 1000 μm.

6. The method according to claim 5, in which the at least one dispersed phase comprises droplets, the diameter of which is less than 200 μm.

7. The method according to claim 1, further comprising the following step:
    setting a predefined flow rate ratio which is a quotient of a flow rate of the flow for the dispersed phase and of a flow rate of the flow for the continuous phase.

8. The method according to claim 7, in which the flow rate ratio is set in the range from 0.1 to 0.9.

9. The method according to claim 8, in which the flow rate ratio is set in the range from 0.5 to 0.9.

10. The method according to claim 1, further comprising the following step:
varying a chemical composition of at least one of the liquids.

11. The method according to claim 10, in which the at least one dispersed phase is formed as a succession of droplets, a chemical composition of which varies.

12. The method according to claim 10, in which the at least one dispersed phase is formed as a succession of droplets, each of which has a different pH value.

13. The method according to claim 1, in which the emulsion contains a plurality of dispersed phases, each of which comprises a succession of dispersed droplets.

14. The method according to claim 1, further comprising the following step:
splitting the emulsion into at least two sub-emulsions.

15. The method according to claim 14, in which the sub-emulsions after splitting comprise droplets having a volume that is equal to a volume of the droplets of the emulsion.

16. The method according to claim 14, in which the sub-emulsions after splitting comprise droplets having a volume that is smaller than a volume of the droplets of the emulsion.

17. The method according to claim 14, in which the splitting of the emulsion takes place in multiple stages at a plurality of branchings.

18. The method according to claim 14, further comprising the following step:
combining the sub-emulsions to form a common emulsion flow.

19. The method according to claim 1, comprising the step:
rearranging the emulsion from a state in which the dispersed phase forms a simple succession of droplets to a state in which the dispersed phase forms a plurality of successions of droplets which are offset relative to one another.

20. The method according to claim 1, further comprising the following step:
fusing two adjacent droplets of the at least one dispersed phase.

21. The method according to claim 20, in which the fusion takes place under the effect of an electric field, irradiation with light or local heating.

22. The method according to claim 1, further comprising the following step:
synchronizing the formation of droplets of the at least one dispersed phase as a function of at least one time schedule.

23. The method according to claim 22, in which the synchronizing comprises a time control of the formation of droplets of a plurality of dispersed phases relative to one another.

24. The method according to claim 22, in which the synchronizing comprises a temporally controlled heating of the flows upstream of the dispersion region.

25. A fluidic microsystem for forming an emulsion including a continuous phase and at least one dispersed phase, said fluidic microsystem comprising:
a dispersion region for forming the emulsion from different liquids, and
a channel which leads to the dispersion region,
wherein
the channel is designed in such a way that flows of the liquids in the channel run next to one another relative to a first reference direction, and
the channel has in the dispersion region a cross-sectional widening at which a cross section of the channel widens in a second reference direction parallel to the channel height.

26. The microsystem according to claim 25, in which the cross-sectional widening comprises a step.

27. The microsystem according to claim 25, in which the channel has an aspect ratio ($W_1/H_1$), calculated from a width ($W_1$) parallel to the first reference direction and a height ($H_1$) perpendicular to the first reference direction, which is selected in a range from 100:1 to 2:1.

28. The microsystem according to claim 25, in which at least one injection channel is connected to the channel, through which injection channel at least one of the flows can be fed into the channel.

29. The microsystem according to claim 28, in which the channel is connected to a plurality of injection channels, at which a plurality of flows can be fed into the channel.

30. The microsystem according to claim 25, which has a dosing device for setting a predefined flow rate ratio of the flows.

31. The microsystem according to claim 25, which has an adjusting device for varying a chemical composition of at least one of the liquids.

32. The microsystem according to claim 25, which has a splitter device with at least one branching for splitting the emulsion into at least two sub-emulsions.

33. The microsystem according to claim 32, in which the splitter device has a plurality of branchings for splitting the emulsion in multiple stages.

34. The microsystem according to claim 32, which has a joining device for combining the sub-emulsions to form a common emulsion flow.

35. The microsystem according to claim 25, which has at least one fusion device for fusing two adjacent droplets of the at least one dispersed phase.

36. The microsystem according to claim 35, in which the fusion device comprises electrodes for generating an electric field, a light source or a heating device.

37. The microsystem according to claim 25, which has at least one synchronization device for synchronizing a formation of droplets of the at least one dispersed phase as a function of at least one time schedule.

38. The microsystem according to claim 37, in which the synchronization device has a heating device which is arranged in the channel.

39. A method for processing an emulsion containing droplets of a dispersed phase in a continuous phase in a fluidic microsystem according to claim 25, said method comprising the following steps:
passing two droplets, which are to be made to interact, across electrodes which are arranged on at least one wall surface of a channel of the fluidic microsystem,
subjecting the electrodes to a voltage pulse, and
fusing the droplets.

40. The method according to claim 39, in which the electrodes are subjected to the voltage pulse when in each case one of the droplets is in contact with one of the electrodes.

41. The method according to claim 39, further comprising the following step:
selecting parameters for controlling the electrodes as a function of a size of the droplets.

42. The method according to claim 39, in which the electrodes are subjected to a voltage pulse having an amplitude of less than 15 V.

43. The method according to claim 39, in which the electrodes are subjected to a voltage pulse having a duration of less than 100 ms.

44. A fusion device for fusing droplets of a dispersed phase in a continuous phase in a channel of a fluidic microsystem according to claim 25, said fusion device comprising:
   at least two electrodes which are arranged on at least one wall surface of a channel of the fluidic microsystem, and
   a control circuit which is designed to subject the electrodes to a voltage pulse when the droplets move past the electrodes so as to fuse the droplets of the dispersed phase in the continuous phase.

45. The fusion device according to claim 44, in which the control circuit is designed to subject the electrodes to a voltage pulse having an amplitude of less than 15 V.

46. The fusion device according to claim 44, in which the control circuit is designed to subject the electrodes to a voltage pulse having a duration of less than 100 ms.

47. The fusion device according to claim 44, in which the electrodes are arranged in such a way that an electric field can be produced with a direction differing from a longitudinal extension of the channel.

48. The fusion device according to claim 47, in which the electrodes are arranged in such a way that an electric field can be produced with a direction oriented transversely to the longitudinal extension of the channel.

49. The fusion device according to claim 47, in which the electrodes are arranged on the at least one wall surface of the channel in such a way that they protrude from two sides towards a center of the channel.

50. The fusion device according to claim 44, in which the electrodes are arranged in such a way that an electric field can be produced with a direction which runs parallel to a longitudinal extension of the channel.

51. The fusion device according to claim 44, in which the electrodes comprise electrically conductive layers on the at least one wall surface of the channel.

52. The fusion device according to claim 44, in which the at least two electrodes comprise one or more electrode arrays in each case with a plurality of electrodes which are arranged on at least one of a bottom, top and side surfaces of the channel.

* * * * *